United States Patent [19]

El Sayed et al.

[11] Patent Number: 5,378,750
[45] Date of Patent: Jan. 3, 1995

[54] FLAME-RETARDANT POLYAMIDE MOLDING COMPOUNDS

[75] Inventors: Aziz El Sayed, Leverkusen; Edgar Ostlinning, Düsseldorf; Karsten-Josef Idel, Krefeld, all of Germany

[73] Assignee: Bayer Aktiengesellschaft, Leverkusen, Germany

[21] Appl. No.: 172,944

[22] Filed: Dec. 27, 1993

[30] Foreign Application Priority Data

Jan. 7, 1993 [DE] Germany .............................. 4300261
Jan. 11, 1993 [DE] Germany .............................. 4300451
Mar. 26, 1993 [DE] Germany .............................. 4309965
Jul. 15, 1993 [DE] Germany .............................. 4323676

[51] Int. Cl.⁶ .......................... C08G 18/60; C08K 3/22

[52] U.S. Cl. ................... 524/400; 525/183; 525/184
[58] Field of Search ................. 524/400; 525/183, 184

[56] References Cited

U.S. PATENT DOCUMENTS

| 4,508,867 | 4/1985 | Sato ................................. 524/434 |
| 4,619,962 | 10/1986 | Sato ................................. 524/401 |
| 5,164,435 | 11/1992 | Abe et al. ........................ 524/304 |
| 5,194,458 | 3/1993 | Tarquini ........................... 524/424 |

*Primary Examiner*—Morton Foelak
*Attorney, Agent, or Firm*—Connolly & Hutz

[57] ABSTRACT

This invention relates to readily processable polyamide molding compounds combining very good mechanical and electrical properties with high surface quality based on copolyamides and magnesium hydroxide.

6 Claims, No Drawings

FLAME-RETARDANT POLYAMIDE MOLDING COMPOUNDS

This invention relates to readily processable polyamide molding compounds combining very good mechanical and electrical properties with high surface quality based on copolyamides and magnesium hydroxide.

Polyamides are high-quality thermoplastics and are distinguished in particular by
- easily processability
- very good mechanical properties
- very good electrical properties
- high heat resistance
- high resistance to chemicals
- very good surface quality.

The properties of polyamides can be significantly extended by reinforcement with glass fibers, glass beads, mineral fillers or mixtures thereof. The addition of elastomers improves, for example, the impact strength of reinforced polyamides. The wide range of possible combinations provides for a very large number of products differing widely in their properties.

Surface quality, for example, can be adversely affected by the use of mineral fillers and/or glass fibers. Polyamides have also long been successfully used in the electrical field. Flame retardant polyamides are mainly used for this particular application. The following flame retardant agents are known and have long been used in polyamides:

Red Phosphorus

The addition of red phosphorus to polyamides is known, for example, from DE-A-3 713 746 A1 (=US-A-4,877,823) and from EP-A299 444 (=US-A-5,081,222). It is mainly added to glass-fiberrenforced PA 66 and 6/6T. On account of the red color of phosphorus and its pigment-like character, compounds such as these can only be supplied in dark colors. In addition, they tend to form phosphine and phosphates on exposure to moisture and heat (through disproportionation of the phosphorus). Phosphine, for example, corrodes copper-containing contacts in electrical installations and equipment. By contrast, phosphates form conductive coatings between the electrical contacts. The disproportionation reaction of the phosphorus is retarded, but not suppressed, by suitable stabilizers.

Organohalogen Compounds

Brominated diphenyls or diphenylethers in combination with antimony trioxide have been used for some time as an additive for polyamides. The following halogen compounds are increasingly used:
- chlorinated cycloaliphatic hydrocarbons (Dechlorane ® plus, a product of Occidental Chemical Co.)
- brominated styrene oligomers (for example in DE-A-2 703 419)
- nucleus-brominated polystyrenes (for example Pyro-Chek 68 ®, a product of FERRO Chemicals).

Zinc salts or iron oxides are also used as synergists for the halogen compounds mentioned. Most halogen-based flame retardant agents begin to decompose at the processing temperatures of polyamides. This results in the formation of corrosive gases which, for example, destroy electrical contacts in switches and electrical installations. In addition, the electrical properties of polyamides are impaired by the ionic decomposition products formed. However, these disadvantages are accepted for the production of parts in light colors.

Nitrogen Compounds

Among the nitrogen compounds, melamine salts above all have been successfully used as flame retardant agents, but only for unreinforced polyamides. Products such as these are light in color and show good electrical properties. The disadvantage of melamine salts is their relatively low decomposition temperature.

Magnesium Hydroxide

Magnesium hydroxide has long been successfully used as a flame retardant agent for polyolefins and elastomers. It has the advantage over the atuminium hydroxide used hitherto of a higher water elimination temperature ($>340°$ C). The use of magnesium hydroxide in polyamides is described in the literature. However, a concentration of more than 55% is necessary to achieve a UL 94 inflammability classification of VO for a thickness of 1.6 mm (UL =Underwriters' Laboratories, USA). The processability of products such as these is problematical. The mechanical properties of moldings produced from them fall to a relatively low level. In addition, surface quality is significantly impaired. In EP-A-0 335 165 (=US 4,963,610), it is proposed to mix potyamide with 0.1 to 20% by weight of a functionalized olefin homopolymer or copolymer and 3 to 30% by weight reinforcing fibers to produce flame-resistant compounds with 40 to 70% special magnesium hydroxide types (specific surface less than 18 $m^2/g$). The UL 94 VO classification (1.6 mm) is not achieved with other types of magnesium hydroxide or without olefinic additives. Through the coupling of the special polyolefins with polyamide and the high filling levels, compounds of the type in question cannot readily be processed.

The problem addressed by the present invention was to provide phosphorus- and halogen-free, readily processable polyamide molding compounds and moldings thereof which would have none of the known disadvantages, would achieve the UL 94 VO classification (1.6 mm) and which in addition would show good mechanical and electrical properties and good surfaces.

It has now been found that the requirements mentioned above are satisfied by using thermoplastic copolyamides, reinforcing materials, elastomer modifiers, magnesium hydroxide and additives, such as lubricants, stabilizers and nucleating agents.

The present invention relates to flame-resistant polyamide molding compounds of
A) 30 to 55% by weight and preferably 35 to 50% by weight of a thermoplastic, partly crystalline copolyamide,
B) 0 to 30% by weight reinforcing materials,
C) 0 to 15% by weight and preferably 0 to 10% by weight elastomer modifiers,
D) 40 to 60% by weight and preferably 45 to 55% by weight magnesium hydroxides and
E) 0 to 2% by weight processing additives.

The present invention also relates to the use of the polyamide molding compounds for the production of molded articles.

The compounds according to the invention are produced in commercially available single-screw and twin-screw extruders or kneaders. The magnesium hydroxide is introduced into the polyamide melt through the granule hopper and/or through a side screw. The reinforcing materials C) (for example glass fibers) are added through the glass fiber opening just before the nozzle in accordance with the prior art. Depending on the polyamides, the melt temperature is between 220° C. and 340° C.

Partly crystalline copolyamides based on partly crystalline polyamides (PA), more particularly PA 6, PA 66, PA 46, PA 610, PA 6/6T, with a copolyamide content of 1 to 30% by weight and preferably 3 to 20% by weight are suitable for use as the thermoplastic copolyamide A) of the molding compounds according to the invention. Copolyamides (CPA) based on PA 6 and PA 66 are most particularly preferred.

Commercially available glass fibers and/or carbon fibers and/or mineral fibers, optionally surface-treated for polyamide, preferably glass fibers, are used as the reinforcing materials B) for the moulding compounds according to the invention.

Commercially available EP(D)M rubbers, acrylate rubbers or EVA copolymers with or without functional coupling groups are used as the elastomer modifier C) according to the invention.

Commercial magnesium hydroxide with or without surface treatment is used as the magnesium hydroxide D) according to the invention. The mechanical properties are distinctly improved by the surface treatment of the magnesium hydroxide with aminosilanes or epoxides. Fine-particle Mg hydroxides (0.4 to 10 microns in diameter) with an apparent density of 0.3 to 0.8 g/ml may be used with advantage in accordance with the invention.

The processing additives E) consist of commercially available lubricants, heat stabilizers and/or nucleating agents.

EXAMPLES

The following products were used in the Examples:
Polyamide 6 =Durethan B31, a product of Bayer AG
PA 6-based copolyamide containing 5% 66 =Durethan B31 M2, a product of Bayer AG.
Polyamide PA 66 =Durethan A 31
PA 66-based copolyamide containing 10% 6 =Radipol C45 H1
Magnesium hydroxide=Magnefin H 10 ®, Securose PA ®
Glass fibers=Bayerglas CS 7919 ®
Elastomer modifier=Exxelor VA 1801 ® or 1803 ®, products of Exxon
Amide wax=Abril wax ®.

EXAMPLES 1 to 8

The starting materials were partly premixed, extruded in a twin-screw extruder at a melt temperature of 250° C. to 290° C. and then granulated. The granules obtained were dried for 4 h at 70° C. in a vacuum drying cabinet and then processed to test specimens in an Arburg injection molding machine at a melt temperature of 290° C.

The mechanical and electrical properties, UL 94 fire behavior and surface quality were determined (see Tables 1 and 2).

TABLE 1

|  |  | Test | | | | |
|---|---|---|---|---|---|---|
|  |  | 1 | 2 | 3 | 4 | |
|  |  | | | Comparison Composition | | |
| Polyamide 6 | % by wt. | 39.30 | 36.30 | — | — | |
| CPA 6/66 95:5 | % by wt. | — | — | 39.30 | 36.30 | |
| Mg hydroxide | % by wt. | 52.00 | 48.00 | 52.00 | 48.00 | |
| Glass fibers | % by wt. | 8.00 | 15.00 | 8.00 | 15.00 | |
| Heat stabilizer | % | 0.25 | 0.25 | 0.25 | 0.25 | |
| Processing add. | % by wt. | 0.45 | 0.45 | 0.45 | 0.45 | |
| Izod impact strength | KJ/m² | 25 | 25 | 27 | 27 | ISO1801C |
| Flexural strength | MPa | 172 | 191 | 177 | 203 | DIN 53452 |
| Outer fiber strain | % | 2.0 | 2.0 | 2.2 | 2.1 | DIN 53452 |
| E modulus in bending | MPa | 10500 | 12300 | 10500 | 12300 | DIN 43457-B3 |
| Tensile strength | MPa | 105 | 129 | 109 | 130 | DIN 53455 |
| Elongation at break | % | 2.0 | 1.7 | 2.0 | 1.7 | DIN 53455 |
| E modulus in tension | MPa | 11000 | 12900 | 10600 | 12700 | DIN 534574 |
| HDT A | °C. | 178 | 190 | 175 | 188 | DIN 53461 |
| HDT B | °C. | 209 | 220 | 207 | 215 | |
| CTI A | Stage | 600 | 600 | 600 | 600 | VDE |
| B | Stage | 600 (M) | 600 (M) | 600 (M) | 600 (M) | 0303TL2 |
| Incandescent wire resistance 1 mm | °C. | 960 | 960 | 960 | 960 | IEC 695-2 |
| Inflammability 3.2 mm | Thickness | V0 | V0 | V0 | V0 | UL94 |
| 1.6 mm | Thickness | V0 | V0 | V0 | V0 | UL94 |
| 0.8 mm | Thickness | V2 | V2 | V2 | V2 | UL94 |
| Surface quality | | Moderate | Poor | Good | Good | |

TABLE 2

|  |  | Test | | | |
|---|---|---|---|---|---|
|  |  | 5 | 6 | 7 | 8 |
|  |  | | | Comparison Composition | |
| Polyamide 66 | % by wt. | 39.30 | 36.30 | — | — |
| CPA 6/66 93:7 | % by wt. | — | — | 39.30 | 36.30 |
| Mg hydroxide | % by wt. | 52.00 | 48.00 | 52.00 | 48.00 |
| Glass fibers | % by wt. | 8.00 | 15.00 | 8.00 | 15.00 |
| Heat stabilizer | % | 0.25 | 0.25 | 0.25 | 0.25 |
| Processing add. | % by wt. | 0.45 | 0.45 | 0.45 | 0.45 |

TABLE 2-continued

| | | Test | | | | |
|---|---|---|---|---|---|---|
| | | 5 | 6 | 7 | 8 | |
| | | | | Comparison Composition | | |
| Izod impact strength | KJ/m² | 19 | 20 | 20 | 22 | ISO1801C |
| Flexural strength | MPa | 158 | 191 | 170 | 191 | DIN 53452 |
| Outer fiber strain | % | 1.8 | 1.8 | 1.9 | 1.8 | DIN 53452 |
| E modulus in bending | MPa | 10600 | 12000 | 10800 | 12760 | DIN 43457-B3 |
| Tensile strength | MPa | 82 | 112 | 98 | 115 | DIN 53455 |
| Elongation at break | % | 0.8 | 0.8 | 1.2 | 1.2 | DIN 53455 |
| E modulus in tension | MPa | 11570 | 12400 | 11400 | 13700 | DIN 534574 |
| HDT A | °C. | 218 | 228 | 215 | 228 | DIN 53461 |
| HDT B | °C. | 247 | 255 | 246 | 250 | |
| CTI A | Stage | 600 | 600 | 600 | 600 | VDE |
| B | Stage | 600 (M) | 600 (M) | 600 (M) | 600 (M) | 0303TL2 |
| Incandescent wire resistance 1 mm | °C. | 960 | 960 | 960 | 960 | IEC 695-2 |
| Inflammability 3.2 mm | Thickness | VO | VO | VO | VO | UL94 |
| 1.6 mm | Thickness | VO | VO | VO | VO | UL94 |
| 0.8 mm | Thickness | V2 | V2 | V2 | V2 | UL94 |
| Surface quality | | Moderate | Poor | Good | Good | |

We claim:

1. A flame-resistant molding composition consisting of a thermoplastic, partially crystalline polyamide and 40–60% by weight, based on weight of molding composition, of magnesium hydroxide, and optionally one or more of a reinforcing material, an elastomer modifier, and processing additives.

2. The composition of claim 1, consisting of 30 to 55% by weight polyamide, 0 to 30% by weight reinforcing material, 0 to 15% by weight elastomer modifier, 40 to 60% by weight magnesium hydroxide, and 0 to 2% by weight processing additives.

3. The composition of claim 1, wherein the polyamide is a copolyamide based on polyamide 6 or polyamide 66.

4. The composition of claim 1, wherein the reinforcing material is one or more of glass fibers, mineral fibers, or carbon fibers.

5. The composition of claim 2, which contains 10–30% by weight of reinforcing material.

6. The composition of claim 2, which contains 4–10% by weight of elastomer modifier.

* * * * *